United States Patent [19]
Takeo et al.

[11] 3,991,034
[45] Nov. 9, 1976

[54] POLYESTER RESIN COMPOSITION

[75] Inventors: Kozi Takeo, Toyohashi; Takashige Kato, Okazaki; Yoshiho Toyota, Okazaki; Akio Nakagi, Okazaki; Takayuki Kado, Okazaki, all of Japan

[73] Assignee: Nippon Ester Co., Ltd., Okazaki, Japan

[22] Filed: Apr. 3, 1975

[21] Appl. No.: 564,979

[30] Foreign Application Priority Data
Apr. 4, 1974  Japan.............................. 49-38141

[52] U.S. Cl........................... 260/75 NK; 260/75 M; 260/77.5 TB; 427/27
[51] Int. Cl.² ................. C08G 18/42; C08G 18/80; B05D 1/06
[58] Field of Search ................. 260/77.5 TB, 75 NK

[56] References Cited
UNITED STATES PATENTS

| | | | |
|---|---|---|---|
| 3,317,463 | 5/1967 | Schonfeld et al. | 260/77.5 TB |
| 3,666,724 | 5/1972 | Hostettler | 260/75 NK |
| 3,684,769 | 8/1972 | Abbott et al. | 260/75 NK |
| 3,808,160 | 4/1974 | Steinmetz | 260/75 NK |
| 3,819,586 | 6/1974 | Rudolph et al. | 260/77.5 TB |

Primary Examiner—H.S. Cockeram
Attorney, Agent, or Firm—Sughrue, Rothwell, Mion, Zinn & Macpeak

[57]  ABSTRACT

A polyester resin composition suitable for preparing a powder paint, obtained by mixing a polyester, which is obtained by depolymerizing a polyester having a high degree of polymerization with an intrinsic viscosity of about 0.4 or more with at least one of a substantially nonvolatile alcohol and an ester having at least one alcoholic hydroxyl group in the same molecule, melts at a temperature between about 45° C and about 120° C and has terminal hydroxyl groups and an average degree of polymerization ranging from about 5 to about 50, with a polyisocyanate blocked with an alkyl p-hydroxybenzoate by melting. The polyester resin composition can be readily pulverized, has no blocking property and has the fluidity at relatively low temperatures sufficient to facilitate pigmentation, and can form beautiful coatings. The coatings have good resistance to weathering, solvents, humidity and fouling, and excellent adhesion to a metal.

9 Claims, No Drawings

POLYESTER RESIN COMPOSITION

BACKGROUND OF THE INVENTION

1. Field of the Invention

This invention relates to a novel polyester resin composition suitable for preparing a powder paint.

2. Description of the Prior Art

Powder paints have been recently developed to overcome the disadvantages of solvent-type paints that, when used, volatilize organic solvents harmful to humans into the atmosphere, and are now regarded as a non-environmental polluting paint. Furthermore, the powder paints have various advantages in that coatings having a thickness of about 40 to 200 $\mu$ can be formed by one coating, that the recovery and reuse of the powder paints are possible, and that high coating yields can be obtained. A powder paint has these advantages, and the demand for a powder paint has rapidly increased in recent years.

It is well known from East German Pat. No. 55,820 that a powder mixture of a polyester having terminal hydroxyl groups with a polyisocyanate blocked with phenol can be applied to a substrate by an electrostatic spray coating or fluidized bed coating, and cured by heating, thereby forming coatings.

However, the cured coatings obtained by heating the powder mixture not only lacks smoothness due to formation of bubbles and insufficient heat flow due to the dissociated phenol, but also often exhibits only an insufficient reactivity even in the presence of a catalyst. Furthermore, the dissociated phenol is very harmful, and the necessity for its removal and recovery also offers a practical disadvantage.

SUMMARY OF THE INVENTION

The present invention relates to a polyester resin composition most suitable for preparing a powder paint, which comprises a polyester and a polyisocyanate blocked with an alkyl p-hydroxybenzoate.

It has now been found that the disadvantages due to the use of a polyisocyanate blocked with phenol can be improved by using a polyisocyanate blocked with an alkyl p-hydroxybenzoate as a curing agent for the polyester, and beautiful coatings can be formed thereby, and a polyester resin composition most suitable for preparing a powder paint has been produced.

The present invention, as described above, provides a polyester resin composition for a powder paint, obtained by mixing a polyester, which is obtained by depolymerizing a polyester having a high degree of polymerization with an intrinsic viscosity of about 0.4 or more with at least one of a substantially nonvolatile alcohol and an ester having at least one alcoholic hydroxyl group in the same molecule, melts at a temperature between about 45° C and about 120° C, and has terminal hydroxyl groups and an average degree of polymerization ranging from about 5 to about 50 with a polyisocyanate blocked with an alkyl p-hydroxybenzoate by melting.

DETAILED DESCRIPTION OF THE INVENTION

That is to say, despite the fact that a polyester resin composition comprising polyester and polyisocyanate blocked with an alkyl p-hydroxybenzoate rapidly undergoes cross-linking by baking at a temperature ranging from about 140° C to about 250° C, cross-linking does not take place at all at a temperature of about 120° C necessary for mixing a pigment, additives, etc. with the polyester resin composition even in the presence of a catalyst. Furthermore, the formation of bubbles and insufficient heat flow appearing when a polyisocyanate blocked with phenol is used, are improved due to a preferable dissociation rate of the polyisocyanate blocked with an alkyl p-hydroxybenzoate and sublimation property possessed by the dissociated alkyl p-hydroxybenzoate, thereby producing beautiful and smooth coatings. The present invention is based on these findings.

The thermosetting polyester resin composition for a powder paint is applied in a powder state mainly to a metallic substrate after preparation of a paint, and successively baked, thereby forming cured coatings. Naturally, it is necessary to keep the temperature used to prepare the paint less than a baking temperature ranging from about 140° C to about 250° C.

Polyethylene terephthalate itself has many excellent characteristics, but has a relatively high melting point such as 230° to 260° C for an average degree of polymerization of about 5 to 50. Thus, it is quite difficult to mix polyethylene terephthalate with a curing agent without cross-linking occurring, and also not easy to pulverize the polyethylene terephthalate by crushing.

The polyesters which can be used in this invention are those having an average degree of polymerization ranging from about 5 to about 50, which is obtained by copolymerizing an acid component mainly comprising terephthalic acid, and an alcohol component mainly comprising ethylene glycol with at least one or more of the following additional acid components, oxyacid components and/or alcohol components to reduce the melting point or softening point thereof.

1. Dicarboxylic acids and oxyacids such as isophthalic acid, phthalic acid, succinic acid, adipic acid, azelaic acid, sebacic acid, dodecanedicarboxylic acid, p-hydroxybenzoic acid, vanillic acid, etc.
2. Polycarboxylic acids such as trimellitic acid, pyromellitic acid, etc.
3. Diols such as diethylene glycol, neopentyl glycol, cyclohexanedimethanol, 1,2-propanediol, 1,3-propanediol, 1,3-butanediol, 1,4-butanediol, 1,6-hexanediol, etc.
4. Polyols such as glycerol, trimethylolethane, trimethylolpropane, pentaerythritol, dipentaerythritol, etc.

However, polycarboxylic acids having three or more carboxyl groups and/or polyols having three or more hydroxyl groups must be used such that the amount of the acid components and/or alcohol components does not exceed about 30 mol %, and further in an amount such that gelation, depending upon the average degree of polymerization of the polyester, does not occur. That is, the amount of the multivalent components which are copolymerizable with the polyester without causing gelation is determined depending upon the average degree of polymerization of the polyester and the number of functional groups contained in the multivalent components. For example, when a multivalent component containing four functional groups is used, the upper limit of the amount of the multivalent component is about 9.6 mol % with respect to a polyester having an average degree of polymerization of about 5 and about 0.69 mol % at an average degree of polymerization of about 50, respectively.

The polyester constituting the polyester resin composition of the present invention is a polyester which melts at a temperature between about 45° to about 120° C, and has terminal hydroxyl groups and an average degree of polymerization ranging from about 5 to about 50.

The terephthalic acid unit used in the present invention includes those units represented by the structural formula,

derived from a terephthalic acid compound, the p-hydroxybenzoic acid unit includes those units represented by the structural formula

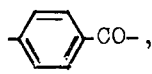

derived from a p-hydroxybenzoic acid compound, the aliphatic dicarboxylic acid unit includes those units represented by the structural formula, $-OC(CH_2)_nCO-$ (wherein $n$ is an integer from 4 to 12), derived from an aliphatic dicarboxylic acid, and the ethylene glycol unit includes those units represented by the structural formula, $-O-CH_2-CH_2-O-$ or $-O-CH_2-CH_2-OH$, derived from an ethylene glycol compound.

Particularly preferred polyesters which can be used in the present invention are polyesters prepared by copolymerizing polyethylene terephthalate with about 20 to about 60 mol % of a p-hydroxybenzoic acid component which are thereby provided with the following advantages:
1. Excellent crushability.
2. Reduction in softening point enabling easy pigmentation.
3. No occurrence of blocking even if the softening point is reduced.
4. Beautiful coatings resulting from baking after the preparation of the paint.
5. Increase in adhesiveness to metals, especially iron.

When it is necessary to further improve the heat flow property of the polyester having an average degree of polymerization ranging from about 20 to about 50, the improvement can be attained by copolymerizing the polyester further with about 0.5 to 30 mol %, preferably 1 to 20 mol % of an aliphatic dicarboxylic acid unit and/or about 5 to 60 mol %, preferably 10 to 50 mol % of a dialcohol unit other than ethylene glycol within a range capable of maintaining this special effect.

Suitable copolymerizable aliphatic dicarboxylic acid components include succinic acid, adipic acid, azelaic acid, sebacic acid, dodecanedicarboxylic acid, etc., and dialcohol components other than ethylene glycol include diethylene glycol, 1,2-propanediol, 1,3-propanediol, 1,3-butanediol, 1,4-butanediol, 1,6-hexanediol, cyclohexanedimethanol, neopentyl glycol, etc.

That is to say, particularly preferred polyesters are polyesters containing about 40 to about 80 mol % of terephthalic acid units, about 20 to about 60 mol % of p-hydroxybenzoic acid units, and about 0 to about 30 mol % of saturated aliphatic dicarboxylic acid units as main acid units, on the basis of total acid units constituting the polyester, and about 40 mol % or more of ethylene glycol as main alcohol units, which are solid at ordinary temperatures, melt at a temperature between about 45° C and about 120° C, and have terminal hydroxyl groups and an average degree of polymerization ranging from about 5 to about 50.

Polyesters having an average degree of polymerization ranging from about 5 to about 50, constituting the polyester resin composition of the present invention are polyesters prepared by conducting an esterification reaction of polycarboxylic acids having two or more carboxy groups, principally terephthalic acid, and/or oxyacids, or their alkyl ester having less than 4 carbon atoms such as a methyl group, an ethyl group or the like and dihydric alcohols, principally ethylene glycol or if necessary, conducting the ester interchange reaction according to the process disclosed in U.S. Pat. No. 3,142,733 in the presence of a conventional ester interchange reaction catalyst such as zinc acetate, lead acetate, manganese acetate, zinc tungstate, lead tungstate, manganese tungstate, zinc carbonate, lead carbonate, manganese carbonate, etc., successively conducting a polycondensation reaction according to the process disclosed in U.S. Pat. No. 3,142,733 in the presence of a polycondensation catalyst such as antimony trioxide, antimony acetate, gerumanium oxide, etc., under reduced pressure, thereby producing higher polymers having an intrinsic viscosity of about 0.4 or more, preferably about 0.6 or more, in a 1:1 by weight mixed solvent of phenol and tetrachloroethane at 20° C, and conducting a depolymerization of the resulting higher polymers with at least one member selected from the group consisting of alcohols, which are substantially nonvolatile at a temperature of about 200° to about 280° C, such as trimethylolethane, trimethylolpropane, pentaerythritol, dipentaerythritol, mannitol, etc., esters having at least one alcoholic hydroxyl group in the same molecule obtained by reacting this nonvolatile alcohol with an aliphatic monocarboxylic acid, and bis-$\beta$-hydroxyethyl terephthalate and $\beta$-hydroxyethyl p-(hydroxyethoxy)benzoate in an amount represented by the following formula, depending upon the average degree of polymerization of the polyester desired, at about 200° to about 280° C under atmospheric pressure or pressurized conditions by an inert gas, for about 1 to 5 hours:

$$\overline{X}_n = \frac{(a_0 + a_1)}{[(b_0 + b_1) - (a_0 + a_1)]}$$

wherein
$\overline{X}_n$: the average degree of polymerization desired
$a_0$: the number of moles of acid components in the higher polymers
$a_1$: the number of moles of acid components subjected to the depolymerization (the aliphatic monocarboxylic acid is considered to be the acid component)
$b_0$: the number of moles of alcohol components in the higher polymers
$b_1$: the number of moles of alcohol components subjected to the depolymerization The substantially nonvolatile alcohol or ester subjected to the depolymerization is selected according to the following criteria:
1. When a diisocyanate blocked with an alkyl p-hydroxybenzoate is used, all or a portion of the polyhydric alcohols containing not less than three alcoholic hydroxy groups is used.

2. The polyhydric alcohols containing not less than three alcoholic hydroxyl groups are used in an amount such that gelation, depending upon the average degree of polymerization, does not occur.

The degree of polymerization of the polyester considerably affects the characteristics of the polyester resin composition, particularly crushability and blocking resistance. Therefore, it is possible to achieve a preferred crushability and exceptional blocking resistance for the polyester resin composition by controlling the degree of polymerization of the polyester to a range between about 5 and about 50. With an average degree of polymerization of less than about 5, it is difficult to store the powder paint in a stable manner and to transport the powder paint due to the blocking property, and also with an average degree of polymerization of more than about 50, it is difficult to crush the polyester to a fine powder.

In preparing a polyester resin composition by mixing the polyester thus prepared with a polyisocyanate blocked with an alkyl p-hydroxybenzoate by melting, it is preferred that the amount of the terminal hydroxyl groups of the polyester is controlled to about 300 to about 3,000 gram-equivalents/$10^6$ grams, (about 16.8 to about 168 mg.OH/g) and further it is preferred that the polyisocyanate blocked with an alkyl p-hydroxybenzoate is mixed by melting at a temperature ranging from about 90° C to 120° C.

Alkyl p-hydroxybenzoates used as a blocking agent in the present invention are alkyl esters, wherein an alkyl moiety has less than 5 carbon atoms such as a methyl group, an ethyl group, an n-butyl group or the like, having a melting point of about 70° C to about 130° C. These alkyl p-hydroxybenzoates can be used individually or in combination.

The polyisocyanates having two or more isocyanate groups suitable for use in the preparation of the polyester resin composition of the present invention include an aromatic polyisocyanate, an aliphatic polyisocyanate, an alicyclic polyisocyanate, etc. such as polymethylene polyphenyl isocyanate, diphenylmethane diisocyanate, tolylene diisocyanate, triphenylmethane triisocyanate, tetramethylene diisocyanate, hexamethylene diisocyanate, trimethylhexamethylene diisocyanate, isophorone diisocyanate, xylylene diisocyanate, lysine diisocyanate, hydrogenated diphenylmethane diisocyanate, hydrogenated tolylene diisocyanate, isopropylidenecyclohexyl diisocyanate, etc. and also include polymers having an average degree of polymerization ranging from about 2 to about 20 of these polyisocyanates, and adducts obtained by reaction of polyisocyanates with di- or more functional alcohols such as ethylene glycol, trimethylolpropane, pentaerythritol, etc. These polyisocyanates can be used individually or in combination.

It is particularly preferred to use polyisocyanates whose isocyanate groups are not directly bonded to an aromatic nucleus, as the polyisocyanate, because the weathering resistance of the resulting cured coatings is particularly excellent.

Suitable polyisocyanates of this type which can be used include tetramethylene diisocyanate, hexamethylene diisocyanate, trimethylhexamethylene diisocyanate, isophorone diisocyanate, xylylene diisocyanate, lysine diisocyanate, hydrogenated diphenylmethane diisocyanate, hydrogenated tolylene diisocyanate, iso-propylidene diisocyanate, etc., and also include polymers of these polyisocyanates, and adducts obtained by reaction of the polyisocyanates with polyalcohols such as ethylene glycol, trimethylolpropane, pentaerythritol, etc.

When these polyisocyanates are used for preparing the polyester resin composition of the present invention, it is preferred that the polyisocyanate is blocked with an alkyl p-hydroxybenzoate in an amount satisfying the following relationship:

$$\frac{f-1}{f} \leq \frac{M}{N} \leq 2.0$$

wherein N is equivalents of isocyanate groups in the polyisocyanate; M is equivalents of terminal hydroxyl groups in the alkyl p-hydroxybenzoate; and $f$ is a functional number of the polyisocyanate so that cross-linking due to the presence of more than one free isocyanate group in the same molecule does not occur during the mixing by melting, or so that the blocking property is not considerably deteriorated.

The polyisocyanate used in this invention, which is blocked with an alkyl p-hydroxybenzoate, can be prepared by the reaction of an alkyl p-hydroxybenzoate and a polyisocyanate in a nitrogen stream at a temperature of about 70° to 150° C in the presence of a reaction catalyst such as di-(n-butyl) tin dilaurate, zinc octylate, iron acetylacetonate, etc., if desired.

It is desirable to add the blocked polyisocyanate thereto in an amount so as to satisfy the relationship:

$$0.5 \leq \frac{N}{H} \leq 2.0$$

wherein N represents the isocyanate group equivalents in the polyester resin composition, and H represents the terminal hydroxyl group equivalents in the polyester resin composition so that the properties of the coatings after the preparation of the paint and baking are quite sufficient, or so that the blocking property is not deteriorated to a considerable extent.

The range of the amount of the blocked polyisocyanate to be used, which satisfies this relationship, has been determined as a result of detailed studies, while taking into account the properties of the coatings after the preparation of the paint and baking, and the endurance of the characteristics possessed by the polyester of the present invention.

That is to say, the following factors must be ideally combined to prepare a polyester resin composition having the various properties required for resins for a powder paint.

1. Kinds and amount of the acid components and the alcohol components constituting the polyester
2. Average degree of polymerization of the polyester
3. Control of the amount of the hydroxy groups reacting with the curing agent
4. Amount of the curing agent, etc.

The preparation of a powder paint using the polyester resin composition of this invention can be attained according to the process disclosed in U.S. Pat. No. 3,624,232. That is, the polyester resin composition, pigments, a leveling agent, etc. are uniformly melt mixed using a heat-roller, an extruder, etc. After allowing the mixture to cool, the resulting mixture is subjected to mechanical grinding using a conventional apparatus such as a hammer mill, turbo-mill and the like.

Now, the present invention will be described in greater detail by way of examples and comparative examples. Unless otherwise indicated, all parts, percents, ratios and the like are by weight.

EXAMPLE 1

Polyesters having a low degree of polymerization were prepared by carrying out an ester interchange reaction of dimethyl terephthalate (hereinafter "DMT"), and dimethyl isophthalate (hereinafter "DMI") or methyl p-hydroxyethoxybenzoate (hereinafter "OEBM") with ethylene glycol (hereinafter "EG") in the amounts shown in Table 1 in the presence of 0.01 mole of zinc acetate as a catalyst, and further carrying out, if necessary, an esterification reaction of the resulting product with any of adipic acid (hereinafter "ADA"), azelaic acid (hereinafter "AZA"), sebacic acid (hereinafter "SEA"), neopentyl glycol (hereinafter "NPG"), and diethylene glycol (hereinafter "DEG") in the amounts shown in Table 1.

Then, 0.02 moles of triphenyl phosphite and 0.02 moles of antimony trioxide were added thereto, and the mixture was subjected to a polycondensation reaction at 270° C under a reduced pressure of 0.5 mmHg, and polyesters having the high degree of polymerization shown in Table 2 were prepared.

Table 1

| Raw Materials | Run No. | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| DMT | 48 | 52 | 43 | 56 | 56 | 56 | 50 | 56 | 56 | 56 | 56 | 50 | 53 | 56 | 48 | 49 |
| DMI | 44 | 40 | 35 | 58 | 38 | 38 | 44 | 34 | — | — | — | — | — | — | — | — |
| OEBM | — | — | — | — | — | — | — | — | 34 | 34 | 34 | 38 | 41 | 24 | 38 | 39 |
| ADA | — | — | 10 | 6 | — | — | — | — | 10 | — | — | — | — | 20 | — | — |
| AZA | — | — | — | — | 6 | — | — | 10 | — | 10 | — | — | — | — | — | — |
| SEA | — | — | 10 | — | — | 6 | — | — | — | — | — | — | — | — | 10 | 10 |
| EG | 140 | 104 | 121 | 162 | 162 | 162 | 124 | 146 | 126 | 126 | 126 | 138 | 147 | 136 | 114 | 117 |
| NPG | — | 40 | 40 | — | — | — | 20 | 40 | 40 | 40 | — | — | 40 | 40 | 40 | — |
| DEG | — | — | — | — | — | — | 20 | — | — | — | — | — | — | — | — | — |

Note: moles of raw materials

Table 2

| Run No. | Intrinsic Viscosity | Amount of Terminal Carboxyl Groups [g-eq./10⁶g (acid value)] |
|---|---|---|
| 1 | 0.65 | 21.5 (1.2) |
| 2 | 0.68 | 20.8 (1.2) |
| 3 | 0.70 | 19.3 (1.1) |
| 4 | 0.68 | 22.8 (1.3) |
| 5 | 0.68 | 19.0 (1.1) |
| 6 | 0.69 | 17.5 (1.0) |
| 7 | 0.68 | 20.7 (1.2) |
| 8 | 0.72 | 19.1 (1.1) |
| 9 | 0.70 | 21.2 (1.2) |
| 10 | 0.71 | 20.4 (1.1) |
| 11 | 0.70 | 20.1 (1.1) |
| 12 | 0.55 | 16.3 (0.9) |
| 13 | 0.54 | 16.8 (0.9) |
| 14 | 0.73 | 24.3 (1.4) |
| 15 | 0.72 | 15.6 (0.9) |
| 16 | 0.64 | 16.0 (0.9) |

Successively, bis-β-hydroxyethyl terephthalate (hereinafter "BHET"), β-hydroxyethyl p-(hydroxyethoxy)benzoate (hereinafter "OEBG"), the ester obtained by reaction of pentaerythritol with stearic acid (molar ratio of pentaerythritol to stearic acid = 1:2, hereinafter "PEST"), trimethylolpropane (hereinafter "TP"), and pentaerythritol (hereinafter "PE") was added to the polyesters of the high degrees of polymerization shown in Table 2 in the amounts shown in Table 3, and the resulting mixtures were subjected to depolymerization at 270° C under atmospheric pressure, thereby preparing the polyesters shown in Table 4.

Table 3

| Run No. | Depolymerization Component | | | | |
|---|---|---|---|---|---|
| | BHET | OEBG | PEST | TP | PE |
| 1 | 8.00 | — | — | — | 5.33 |
| 2 | 4.50 | 3.50 | — | — | 5.33 |
| 3 | 2.00 | — | — | 1.80 | 1.20 |
| 4 | — | — | — | 4.40 | 0.60 |
| 5 | — | — | — | 4.40 | 0.60 |
| 6 | — | — | — | 4.40 | 0.60 |
| 7 | 6.00 | — | — | — | 4.00 |
| 8 | — | — | 3.33 | — | — |
| 9 | — | — | — | 4.40 | 0.60 |
| 10 | — | — | — | 4.40 | 0.60 |
| 11 | — | — | — | 4.40 | 0.60 |
| 12 | 6.00 | 6.00 | — | — | 6.18 |
| 13 | 3.00 | 3.00 | — | — | 4.00 |
| 14 | — | — | — | 3.80 | 0.20 |
| 15 | 2.00 | 2.00 | — | — | — |
| 16 | 1.00 | 1.00 | 1.33 | — | — |

Note: Moles of depolymerization component

Table 4

| Run No. | Average Degree of Polymerization | | Terminal Groups | | Softening Point (° C) |
|---|---|---|---|---|---|
| | Calculated | Found | COOH | OH | |
| 1 | 7.5 | 7.3 | 0.86 | 37.21 | 75 |
| 2 | 7.5 | 7.3 | 0.84 | 37.23 | 75 |
| 3 | 20.0 | 19.0 | 0.92 | 15.20 | 70 |
| 4 | 20.0 | 19.2 | 0.86 | 15.16 | 80 |
| 5 | 20.0 | 19.2 | 0.82 | 15.20 | 80 |
| 6 | 20.0 | 19.3 | 0.82 | 15.14 | 80 |
| 7 | 10.0 | 9.6 | 0.90 | 23.94 | 70 |
| 8 | 30.0 | 28.4 | 0.88 | 6.16 | 85 |
| 9 | 20.0 | 19.5 | 0.96 | 14.90 | 75 |
| 10 | 20.0 | 19.4 | 0.90 | 15.00 | 75 |
| 11 | 20.0 | 19.1 | 0.92 | 15.16 | 75 |
| 12 | 5.5 | 5.3 | 0.88 | 50.60 | 70 |
| 13 | 10.0 | 9.6 | 0.95 | 27.89 | 75 |
| 14 | 25.0 | 24.2 | 0.76 | 11.44 | 65 |
| 15 | 25.0 | 24.3 | 0.82 | 7.42 | 75 |
| 16 | 30.0 | 28.1 | 0.81 | 6.31 | 85 |

Note: Terminal groups: g-eq./100 moles of acid component

EXAMPLE 2

Blocked isocyanates were prepared by mixing polyisocyanates with the alkyl p-hydroxybenzoates shown in Table 5 in the presence of 0.35 moles of dibutyl tin dilaurate as a catalyst at 150° C by melting in a nitrogen atmosphere.

Table 5

| Run No. | Polyisocyanate Compound Name | Amount (moles) | Alkyl p-Hydroxybenzoate Compound Name | Amount (moles) | Equivalent Ratio |
|---|---|---|---|---|---|
| I | Isophorone Diisocyanate | 50 | Methyl p-Hydroxybenzoate | 100 | 1.00 |
| II | Trimethylhexamethylene Diisocyanate | 50 | Methyl p-Hydroxy benzoate | 120 | 1.20 |
| III | Hexamethylene Diisocyanate | 50 | Propyl p-Hydroxybenzoate | 80 | 0.80 |
| IV | Xylylene Diisocyanate | 50 | Isopropyl p-Hydroxybenzoate | 200 | 2.00 |
| V | Hydrogenated Tolylene Diisocyanate | 50 | Ethyl p-Hydroxybenzoate | 150 | 1.50 |
| VI | Lysine Diisocyanate | 50 | Butyl p-Hydroxybenzoate | 100 | 1.00 |
| VII | Tolylene Diisocyanate | 50 | Methyl p-Hydroxybenzoate | 180 | 1.80 |
| VIII | Diphenylmethane Diisocyanate | 50 | Propyl p-Hydroxybenzoate | 60 | 0.60 |
| IX | Triphenylmethane Triisocyanate | 50 | Isopropyl p-Hydroxybenzoate | 150 | 1.00 |
| X | Polymethylenepolyphenyl Isocyanate | 50 | Methyl p-Hydroxy benzoate | 200 | 1.00 |

Note:
Polymethylenepolyphenyl isocyanate contains on the average 4.0 isocyanate groups.

The equivalent ratio represents the ratio of the moles of alkyl p-hydroxybenzoate to the equivalents of isocyanate groups.

Polyisocyanates were blocked with alkyl p-hydroxybenzoates in the same manner as described above, and then polyalcohols were added thereto in the amounts shown in Table 6, and subjected to mixing by melting at 150° C in a nitrogen atmosphere, thereby preparing blocked isocyanate adducts.

Then, the polyesters prepared in Example 1 were mixed with these blocked isocyanates by melting at 100° C in the amounts shown in Table 7, thereby preparing the polyester resin compositions shown in Table 7.

Table 6

| Run No. | Polyisocyanate Compound Name | Amount (moles) | Alkyl p-Hydroxybenzoate Compound Name | Amount (moles) | Equivalent Ratio[1] | Polyalcohol Compound Name | Amount (moles) | Equivalent Ratio[2] |
|---|---|---|---|---|---|---|---|---|
| XI | Isophorone Diisocyanate | 50 | Methyl p-Hydroxybenzoate | 50 | 0.50 | Ethylene Glycol | 25 | 2.00 |
| XII | Xylylene Diisocyanate | 50 | Methyl p-Hydroxybenzoate | 40 | 0.40 | Ethylene Glycol | 30 | 1.33 |
| XIII | Hydrogenated Tolylene Diisocyanate | 50 | Butyl p-Hydroxybenzoate | 45 | 0.45 | Trimethylolpropane | 20 | 2.25 |
| XIV | Tolylene Diisocyanate | 50 | Ethyl p-Hydroxybenzoate | 50 | 0.50 | Trimethylolpropane | 30 | 1.67 |
| XV | Diphenyl methane Diisocyanate | 50 | Propyl p-Hydroxybenzoate | 50 | 0.50 | Pentaerythritol | 13 | 3.85 |

Note
Equivalent ratio [1] represents the ratio of the moles of alkyl p-hydroxybenzoate to the equivalents of isocyanate groups.
Equivalent ratio [2] represents a ratio of moles of alkyl p-hydroxybenzoate to moles of polyalcohol, that is, numbers of functional groups of blocked isocyanate groups per mole of polyalcohol.

Table 7

| Resin Composition Run No. | Polyester | Blocked Isocyanate Run No. | Amount Mixed (moles) | Softening Point (° C) | N/H | Blocking Temperature (° C) |
|---|---|---|---|---|---|---|
| U-1 | 1 | I | 20.0 | 70 | 1.07 | 35 |
| U-2 | 2 | II | 30.0 | 70 | 1.61 | 35 |
| U-3 | 3 | III | 5.0 | 70 | 0.66 | 40 |
| U-4 | 4 | IV | 10.0 | 75 | 1.32 | 40 |
| U-5 | 5 | V | 15.0 | 80 | 1.97 | 40 |
| U-6 | 6 | VI | 7.5 | 75 | 0.99 | 35 |
| U-7 | 7 | VII | 10.0 | 70 | 0.84 | 35 |
| U-8 | 8 | VIII | 3.0 | 85 | 0.97 | 40 |
| U-9 | 9 | IX | 5.0 | 75 | 1.01 | 45 |
| U-10 | 10 | X | 4.0 | 70 | 1.07 | 45 |
| U-11 | 11 | XI | 7.5 | 75 | 0.99 | 45 |
| U-12 | 12 | XII | 41.5 | 70 | 1.09 | 40 |

Table 7-continued

| Run No. Resin Composition | Polyester | Blocked Isocyanate Run No. | Amount Mixed | Softening Point | N/H | Blocking Temperature |
|---|---|---|---|---|---|---|
| U-13 | 13 | XIII | 15.0 | 70 | 1.21 | 45 |
| U-14 | 14 | XIV | 10.0 | 65 | 1.46 | 45 |
| U-15 | 15 | XV | 2.0 | 70 | 1.04 | 45 |
| U-16 | 16 | XV | 3.0 | 80 | 1.83 | 45 |

Note
N represents the equivalents of isocyanate groups in the polyester resin composition.
H represents the equivalents of hydroxyl groups in the polyester resin composition.

These polyester resin compositions were pulverized by Micronvictory Mill, type VP-1, made by Hosokawa Tekkosho K.K., Japan, and it was found that Resin Compositions U-1 to U-8 could be fed at a rate of more than 30 kg/hr, and Resin Compositions U-9 to U-16 could be fed at a rate of more than 35 kg/hr, and more than 95% of the respective powders could be passed through a 150-mesh sieve.

Then, the respective powders which passed a 150-mesh sieve were applied to steel plates (0.8 mm × 100 mm × 200 mm) to a coating thickness of 100 microns by electrostatic spray coating, and baked at 180° C for 30 minutes, whereby beautiful coatings were obtained. Thus, the resulting coated plates were subjected to the following evaluation, and the results obtained are shown in Table 8.

1. Impact Resistance Test: Du Pont type (½ inch - 1kg)
2. Erichsen Test: According to JIS Z 2247
3. 60° Mirror Surface Reflection: According to JIS Z 8741
4. Heat Resistance Test: According to JIS K 6902
5. Boiling Resistance Test: Erichsen test after treatment according to JIS K 6902
6. Fouling Resistance Test: According to JIS K 6902
7. Acetone Resistance Test: According to JIS K 6911
8. Weathering Resistance Test: 60° mirror surface reflection after outdoor exposure for 1 year Table 8

| Run No. | Impact Resistance | Erichsen | 60° Mirror Surface Reflection | Heat Resistance | Boiling Resistance | Fouling Resistance | Acetone Resistance | Weathering Resistance |
|---|---|---|---|---|---|---|---|---|
|  | (cm) | (m/m) | (%) |  | (m/m) |  |  | (%) |
| U-1 | 50 | > 9 | 99 | Good | > 9 | Good | Good | 95 |
| U-2 | 50 | > 9 | 98 | Good | > 9 | Good | Good | 95 |
| U-3 | > 50 | > 9 | 98 | Good | > 9 | Good | Good | 94 |
| U-4 | > 50 | > 9 | 97 | Good | > 9 | Good | Good | 96 |
| U-5 | > 50 | > 9 | 99 | Good | > 9 | Good | Good | 95 |
| U-6 | > 50 | > 9 | 98 | Good | > 9 | Good | Good | 94 |
| U-7 | > 50 | > 9 | > 100 | Good | > 9 | Good | Good | 75 |
| U-8 | > 50 | > 9 | 99 | Good | > 9 | Good | Good | 73 |
| U-9 | > 50 | > 9 | > 100 | Good | > 9 | Good | Good | 68 |
| U-10 | > 50 | > 9 | 96 | Good | > 9 | Good | Good | 72 |
| U-11 | > 50 | > 9 | 99 | Good | > 9 | Good | Good | 93 |
| U-12 | 50 | > 9 | 98 | Good | > 9 | Good | Good | 96 |
| U-13 | > 50 | > 9 | > 100 | Good | > 9 | Good | Good | 96 |
| U-14 | > 50 | > 9 | > 100 | Good | > 9 | Good | Good | 76 |
| U-15 | > 50 | > 9 | 98 | Good | > 9 | Good | Good | 73 |
| U-16 | > 50 | > 9 | 97 | Good | > 9 | Good | Good | 72 |

Table 9

| Run No. | Isophorone Diisocyanate | Methyl p-Hydroxybenzoate | Equivalent Ratio |
|---|---|---|---|
|  | (moles) | (moles) |  |
| XVI | 0.5 | 3.0 | 3.00 |
| XVII | 0.5 | 0.4 | 0.40 |

A polyester having the same composition and same degree of polymerization as those of Run No. 1 in Example 1 was prepared in a 1/100 scale miniature apparatus, and mixed with blocked isocyanates by melting at 100° C in the amounts shown in Table 10, thereby preparing polyester resin compositions.

Table 10

| Resin Composition Run No. | Blocked Isocyanate Run No. | Amounts Mixed | Softening Point | N/H |
|---|---|---|---|---|
|  |  | (moles) | (° C) |  |
| U-17 | XVI | 0.2 | 65 | 1.07 |
| U-18 | XVII | 0.2 | 75 | 1.07 |

Polyester Resin Composition U-17 had a blocking temperature of 30° C and thus had a slight problem in blocking property. However, when the resin composition was subjected to electrostatic spray coating and baking in the same manner as in Example 2, a beautiful coating was obtained, and the properties of the coating were good.

Polyester Resin Composition U-18 had insufficient polyisocyanate blocking, and thus an increase in melt viscosity took place during preparation. However, when the resin composition was subjected to electrostatic spray coating and baking in the same manner as in Example 2, good coating properties were obtained,

EXAMPLE 3

Blocked isocyanates were prepared by mixing isophorone diisocyanate with methyl p-hydroxybenzoate by melting at 150° C in the amounts shown in Table 9.

although the coating had a slightly insufficient smoothness.

EXAMPLE 4

A polyester having the same composition and same degree of polymerization as those of Run No. 3 in Example 1 was prepared in a 1/100 scale miniature apparatus. Successively, polyester resin compositions were prepared by mixing the polyester with blocked isocyanate Run No. III prepared in Example 2 by melting at 100° C in the amounts shown in Table 11.

Table 11

| Resin Composition Run No. | Blocked Isocyanate Run No. | Amount Mixed | Softening Point | N/H |
|---|---|---|---|---|
| | | (moles) | (° C) | |
| U-19 | III | 0.20 | 70 | 2.63 |
| U-20 | III | 0.03 | 75 | 0.39 |

Of the above polyester resin compositions, U-19 had a low blocking temperature, that is 25° C, and had a problem in blocking property. However, when U-19 was subjected to electrostatic spay coating and baking in the same manner as in Example 2, a beautiful coating was obtained, and the coating properties were good.

When U-20 was likewise subjected to formation of a cured coating in the same manner as in Example 2, U-20 was a slightly poor in coating properties, for example, 3 mm for the Erichsen test and 10 cm for impact resistance, but a beautiful coating was obtained.

EXAMPLE 5

1 mol of terephthalic acid, 0.6 mols of ethylene glycol and 0.4 mols of neopentyl glycol were charged into a three necked flask equipped with a packing tower, water was removed at 220° C while maintaining the packing tower at 100° C and flowing nitrogen gas through the system, and then the esterification reaction was conducted for 5 hours to prepare a low molecular weight polyester.

Subsequently, $2 \times 10^{-4}$ mols of antimony trioxide as a catalyst was added thereto and a polycondensation reaction was conducted at 270° C under reduced pressure to prepare a highly polymerized polyester having an intrinsic viscosity of 0.65 to 0.66.

Thereafter, 0.05 mols of trimethylol propane was added and a depolymerization reaction was conducted for 2 hours. The above procedures were repeated 10 times.

The result obtained are shown in Table 12 below.

Table 12

| Run No. | Time of Polycondensation Reaction | | Average Degree of Polymerization |
|---|---|---|---|
| 1 | 3 hours and | 15 minutes | 20.5 |
| 2 | 3 | 05 | 19.8 |
| 3 | 3 | 10 | 19.6 |
| 4 | 3 | 15 | 20.2 |
| 5 | 3 | 15 | 20.3 |
| 6 | 3 | 00 | 20.0 |
| 7 | 3 | 20 | 19.7 |
| 8 | 3 | 05 | 19.4 |
| 9 | 2 | 55 | 20.2 |
| 10 | 2 | 55 | 20.4 |

COMPARATIVE EXAMPLE 1

Polyesters having the same composition as that of Run No. 15 in Example 1 and average degrees of polymerization of 3.5 and 65 were prepared in a 1/100 scale miniature apparatus. The polyester having an average degree of polymerization of 3.5 had a blocking temperature of 20° C and a considerable blocking property at room temperature, and was difficult to pulverize by crushing.

On the other hand, the polyester having an average degree of polymerization of 65 was tough, and fine powders which could pass through a 150-mesh sieve could not be obtained by crushing.

COMPARATIVE EXAMPLE 2

An ester interchange reaction was carried out in the same manner as in Example 1, using 56 moles of DMT, 44 moles of OEBM and 136 moles of EG, and then the resulting products were subjected to a polycondensation at a reaction temperature of 210° C under a reduced pressure of 0.5 mmHg, thereby preparing the polyesters of high degrees of polymerization shown in Table 13.

Table 13

| Run No. | Intrinsic Viscosity | Terminal Carboxy Groups |
|---|---|---|
| | | [g-eq./10 g (acid value)] |
| 1 | 0.65 | 20.8 (1.2) |
| 2 | 0.66 | 21.1 (1.2) |
| 3 | 0.65 | 21.0 (1.2) |

Successively, 8.00 moles of EG and 5.33 moles of PE were added to these polyesters of high degrees of polymerization, and subjected to depolymerization at 270° C under atmospheric pressure, thereby preparing the polyesters shown in Table 14.

Table 14

| Run No. | Average Degree of Polymerization | | Terminal Groups | | Softening Point |
|---|---|---|---|---|---|
| | Calculated | Found | COOH | OH | (° C) |
| 1 | 7.5 | 9.2 | 0.84 | 31.56 | 80 |
| 2 | 7.5 | 7.7 | 0.86 | 35.78 | 75 |
| 3 | 7.5 | 8.9 | 0.86 | 32.28 | 75 |

Note
Terminal groups: g-eq./100 moles of acid components

It can be seen from the results in Table 14 that when an alcohol, which is volatile at 270° C, for example, EG, is used in the depolymerization, the tendencies that the amount of the alcohol component consumed in the depolymerization is not stable, can be seen, and good control of the average degree of polymerization cannot be achieved.

COMPARATIVE EXAMPLE 3

Using the same low molecular weight polyester composition produced in Example 5 above, $1 \times 10^{-4}$ mol of zinc acetate as a catalyst was added thereto. The pressure in the flask was gradually reduced for 1.5 hours at 220° C and when the pressure reached 1 mmHg, the polycondensation reaction was stopped. This procedure was repeated 10 times.

The results obtained are shown in Table 15 below.

Table 15

| Run No. | Average Degree of Polymerization |
|---|---|
| 1 | 16.3 |
| 2 | Gelation |
| 3 | Gelation |
| 4 | 21.4 |

Table 15-continued

| Run No. | Average Degree of Polymerization |
|---|---|
| 5 | Gelation |
| 6 | 20.3 |
| 7 | 23.9 |
| 8 | Gelation |
| 9 | Gelation |
| 10 | 18.4 |

As is apparent from Examples 1 and 5 and Comparative Examples 2 and 3, depolymerization with a substantially non-volatile alcohol has a very good effect upon controlling of the average degree of polymerization of the polyester, which greatly influences the crushability and blocking property of the polyester resin composition.

As is apparent from Examples 2 and 3, cross-linking tends to take place on mixing by melting, if the amount of the alkyl p-hydroxybenzoate, which acts to block the polyisocyanate, is less than $$\frac{f-1}{f}$$

equivalents, wherein $f$ is a functional number of the polyisocyanate and the blocking resistance of a polyester resin composition tends to be decreased, if the amount of the alkyl p-hydroxybenzoate is more than 2.0 equivalents.

As is also apparent from Examples 2 and 4, it is preferable to select the amount of blocked isocyanate to be mixed with the polyester by melting in the range defined by the formula, depending upon the amount of the hydroxyl groups possessed by the polyester in order to prepare a polyester resin composition providing a desirably excellent coating.

It is apparent from the Examples and the Comparative Examples that the polyester resin compositions of the present invention are most preferred as a vehicle for a powder paint. Also, as is apparent from Example 1 and Comparative Example 1, it is a necessary and indispensable condition for using a polyester resin composition as a vehicle for a powder paint to control the average degree of polymerization of the polyester to a range between about 5 and about 50.

While the invention has been described in detail and with reference to specific embodiments thereof, it will be apparent to one skilled in the art that various changes and modifications can be made therein without departing from the spirit and scope thereof.

What is claimed is:

1. A polyester resin composition for a powder paint, obtained by mixing (a) a polyester in a molten state, which is obtained by depolymerizing a polyester having a high degree of polymerization with an intrinsic viscosity of about 0.4 or more with at least one of a substantially nonvolatile alcohol and an ester having at least one alcoholic hydroxyl group in the same molecule, melts at a temperature between about 45° C and about 120° C and has terminal hydroxyl groups and an average degree of polymerization ranging from about 5 to about 50, with (b) at least one organic polyisocyanate blocked with at least one alkyl p-hydroxybenzoate, wherein the alkyl group has less than 5 carbon atoms.

2. The polyester resin composition for a powder paint according to claim 1, wherein the polyester contains about 40 to about 80 mol % of terephthalic acid units, about 20 to about 60 mol % of p-hydroxybenzoic acid units and about 0 to about 30 mol % of saturated aliphatic dicarboxylic acid units as main acid units, and ethylene glycol as a main alcohol unit.

3. The polyester resin composition for a powder paint according to claim 1, wherein the polyester contains as alcohol units less than 30 mol % of a polyalcohol having three or more hydroxyl groups and/or as acid units less than 30 mol % of a polycarboxylic acid having three or more carboxyl groups must be used and further, in such an amount that gelation does not occur.

4. The polyester resin composition for a powder paint according to claim 1, wherein the substantially nonvolatile alcohol is a polyhydric alcohol having three or more hydroxy groups and the ester having at least one alcoholic hydroxyl group in the same molecule is an ester obtained by esterification of a polyhydric alcohol having three or more hydroxy groups with at least one of a saturated aliphatic monocarboxylic acid, bis-$\beta$-hydroxyethylterephthalate and $\beta$-hydroxyethyl p-hydroxyethoxybenzoate.

5. The polyester resin composition for a powder paint according to claim 1, wherein the amount of the terminal hydroxyl groups is about 300g-equivalents/$10^6$g to about 3000g-equivalents/$10^6$g corresponding to about 16.8 mg OH/g to about 168 mg OH/g, respectively.

6. The polyester resin composition for a powder paint according to claim 1, wherein the organic polyisocyanate blocked with an alkyl p-hydroxybenzoate is prepared in an amount satisfying the following relationship:

$$\frac{f-1}{f} \leq \frac{M}{N} \leq 2.0$$

wherein N is equivalents of isocyanate groups within the organic polyisocyanate, M is equivalents of terminal hydroxyl groups within the alkyl p-hydroxybenzoate, and $f$ is a functional number of the organic polyisocyanate.

7. The polyester resin composition for a powder paint according to claim 1, wherein the blocked polyisocyanate is present in an amount satisfying the following relationship:

$$0.5 \leq \frac{N}{H} \leq 2.0$$

wherein N is the equivalents of isocyanate groups in the polyester resin composition, and H is the equivalents of terminal hydroxyl groups in the polyester resin composition.

8. The polyester resin composition for a powder paint according to claim 1, wherein the organic polyisocyanate is at least one organic polyisocyanate selected from the group consisting of aliphatic polyisocyanates, alicyclic polyisocyanates and aromatic polyisocyanates whose isocyanate groups are not directly bonded to the aromatic nucleus.

9. The polyester resin composition for a powder paint according to claim 1, wherein said alkyl group is a methyl group, an ethyl group, or an n-butyl group.

* * * * *